Sept. 16, 1947.    H. L. WILLIAMS    2,427,585
CAMERA FILM MAGAZINE
Filed July 28, 1944    3 Sheets-Sheet 1
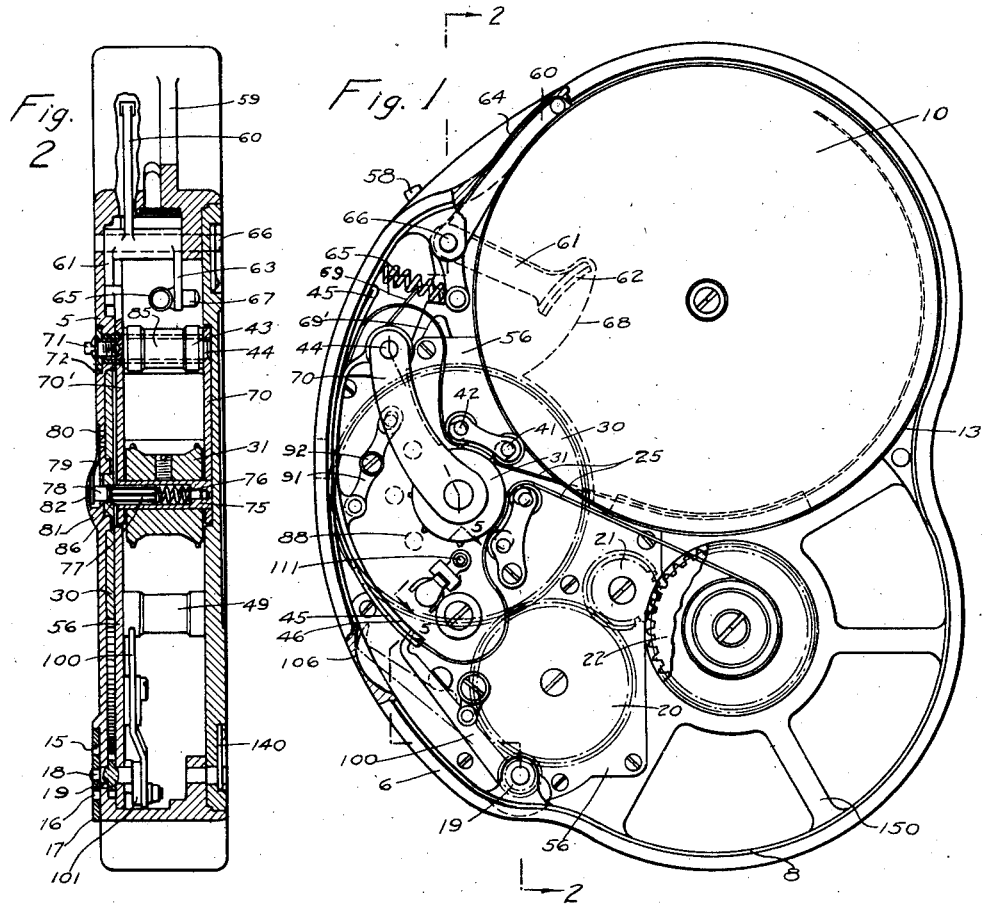
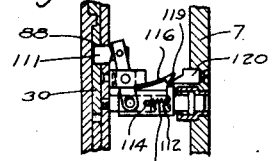
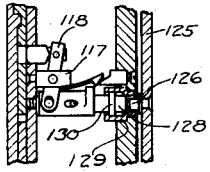
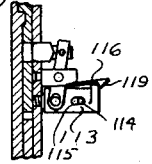
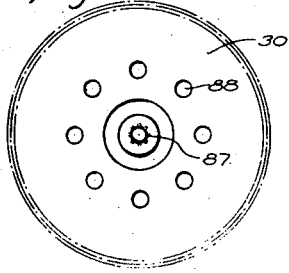
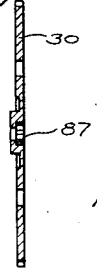
INVENTOR:
HERBERT LLOYD WILLIAMS
BY
ATTORNEY Sept. 16, 1947.  H. L. WILLIAMS  2,427,585
CAMERA FILM MAGAZINE
Filed July 28, 1944  3 Sheets-Sheet 2
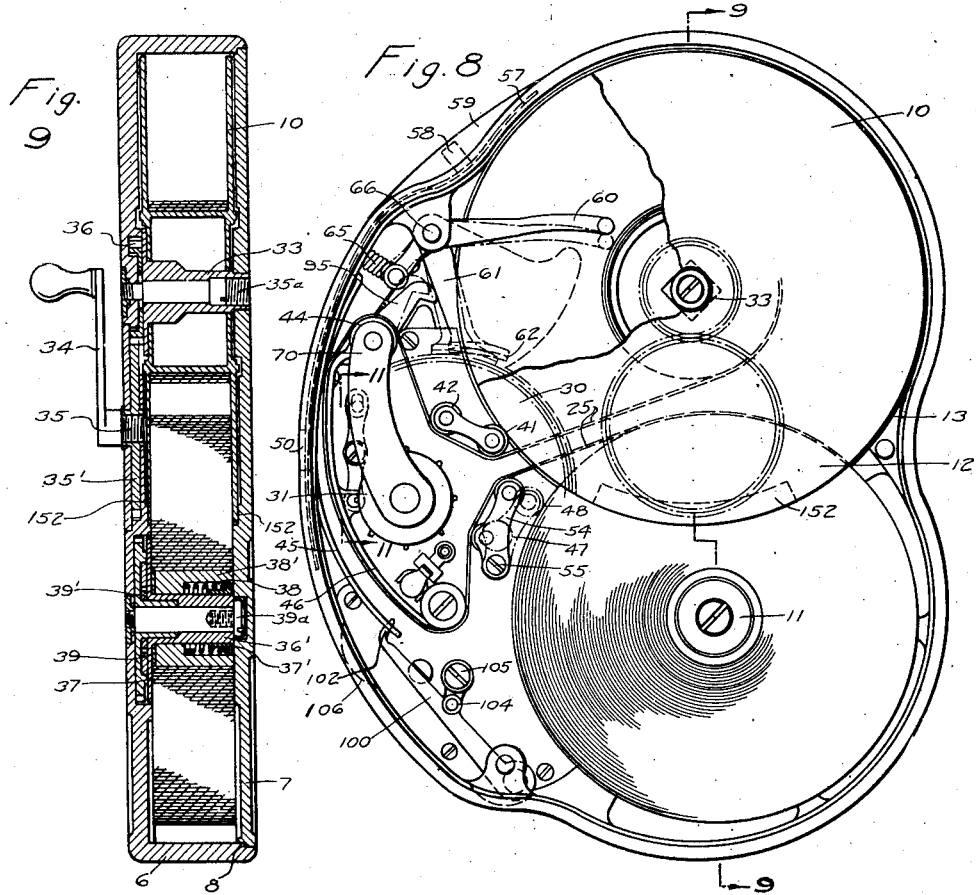
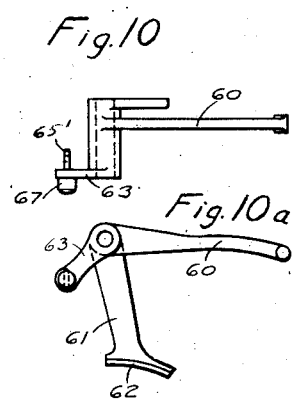
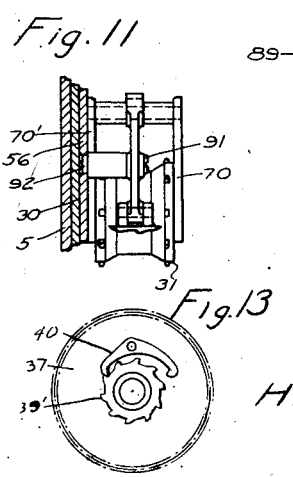
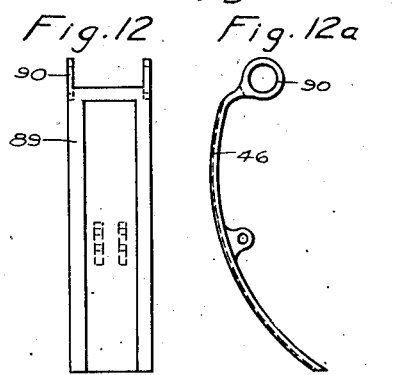
INVENTOR:
HERBERT LLOYD WILLIAMS
BY Gordon C. Mack
ATTORNEY Sept. 16, 1947.       H. L. WILLIAMS              2,427,585
                     CAMERA FILM MAGAZINE
                     Filed July 28, 1944          3 Sheets-Sheet 3
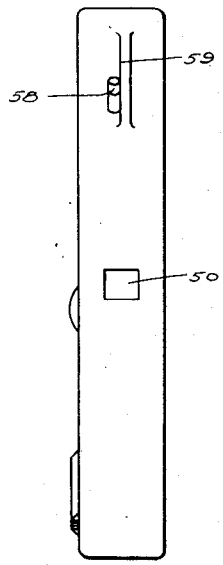
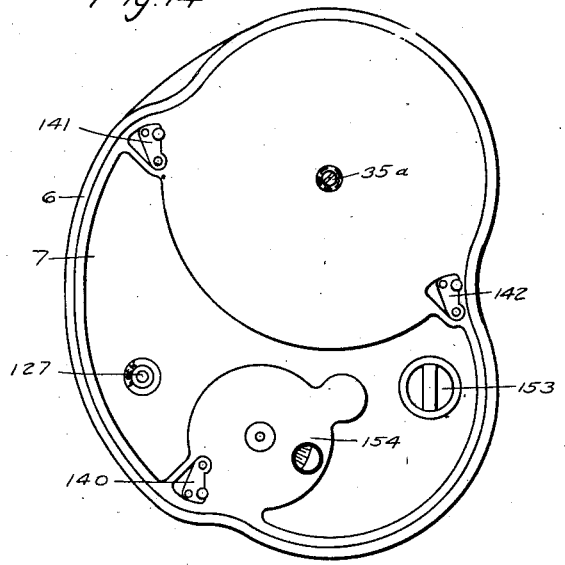
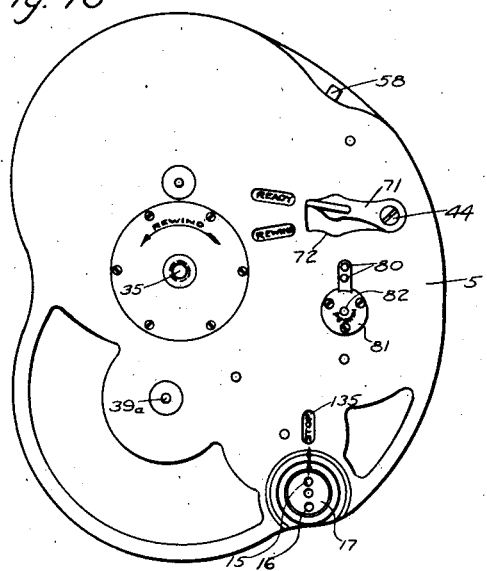
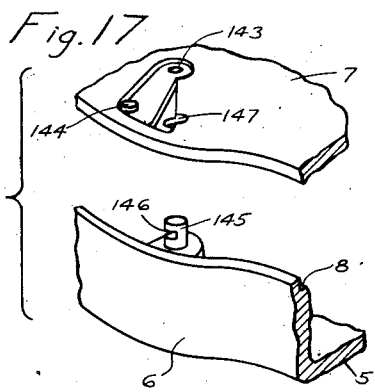
INVENTOR:
HERBERT LLOYD WILLIAMS
BY
ATTORNEY Patented Sept. 16, 1947

2,427,585

UNITED STATES PATENT OFFICE 2,427,585

CAMERA FILM MAGAZINE

Herbert Lloyd Williams, Coconut Grove, Fla.

Application July 28, 1944, Serial No. 546,967

20 Claims. (Cl. 88—17)

This invention relates to an improved magazine for use in a motion-picture camera and to a combination of a magazine with a camera.

The magazine is of the type which is loaded with film wound on a daylight spool; i. e., a spool with light-excluding ends. The film is wound from this spool onto a spindle and then back onto the spool again. It is preferably exposed as it is transferred from the spool to the spindle but may first be transferred to the spindle and then be exposed as it is returned to the spool. When wound back onto the daylight spool, the film may be removed from the magazine in daylight. This is a decided advance over the magazines now in use which must be taken to a dark room for removal of the exposed film. In the preferred arrangement shown in the drawings, the centers of the spindle and spool are placed so close together that as the film is wound from the spool onto the spindle and the amount on the spindle increases, the film on the spindle occupies space between the flanges of the daylight spool. Such an arrangement is disclosed and claimed in my copending application Serial No. 452,751, filed July 29, 1942.

The magazine of this invention includes means for preventing the removal of all of the film from the spool to the spindle or from the spool back onto the spindle, which is herein generally referred to as the braking device. In the preferred form of the invention shown in the drawings the brake presses against a gear of the chain that drives the reeling mechanism of the magazine and thus prevents further transferral of film from the spool to the spindle when the film is almost entirely removed from the spool, and in this manner the film is prevented from becoming entirely separated from the spool. This is necessary in a magazine of the type shown in which the film can be wound from the spindle back onto the daylight spool only if the film is never completely separated from the spool.

The magazine of this invention includes a throw-out bracket which carries a sprocket which controls the rate of travel of the film in one direction. The sprocket is disengaged from the film when the film travels in the opposite direction. In the drawings the film is exposed as it is reeled from the spool onto the spindle, and the sprocket on the throw-out bracket engages the film when it is traveling in this direction. When the film is returned from the spindle to the spool, the sprocket on the throw-out bracket is disengaged. In the preferred arrangement shown in the drawings the throw-out bracket is equipped to release the brake when the throw-out bracket is moved to disengage the sprocket from the perforations in the film.

The magazine of this invention includes a movable gate which guides the film across the exposure opening. This gate is formed of halves, one half being stationary or fastened to the wall of the magazine, and the other half being separated or opened when the sprocket in the throw-out bracket is disengaged from the film so that the film may then be free to pass between the halves by being rapidly reeled back past the exposure opening. This exposure opening is provided with a light-tight slide that is always in a closed position while the magazine is removed from the camera. This slide is operated by a mechanism in the lid or cover of the camera that opens and closes the exposure opening when the latch of the lid is moved to a closed or opened position.

When the throw-out bracket is brought to the position in which it is in mesh with the film, the two halves of the gate are brought together so that the gate holds the film close to the exposure opening. Because the gate is open when the throw-out bracket is in the one position and is closed with the throw-out bracket in the other position, the preferred form of the invention shown in the drawings provides for simultaneous opening or closing of the gate and movement of the throw-out bracket.

The magazine includes pull-down mechanism for imparting intermittent motion to the film as it passes across the exposure opening. This mechanism is operated by the same mechanism which drives the film.

An important feature of the invention not limited to the particular type of magazine here described is the locking means which prevents movement of the film in front of the exposure opening except when the magazine is in the camera. The camera is equipped with means which unlocks the film-moving mechanism of the magazine.

The invention will be more fully described in connection with the accompanying drawings, in which:

Fig. 1 is a plan view of the magazine with the light-tight cover removed and portions of the magazine wall broken away at the upper left and lower left of the figure to show hollowed-out portions of the wall;

Fig. 2 is a section on the line 2—2 of Fig. 1 with a portion of the wall of the magazine broken away at the top of the figure to show the same portion of the brake mechanism;

Figs. 3-5 are details of means for locking the film-moving mechanism of the magazine, Fig. 5 being taken on the line 5—5 of Fig. 1;

Figs. 6 and 7 are a plan and section of gear on which the locking mechanism of Figs. 3-5 operates;

Fig. 8 is a view similar to the view in Fig. 1 but with the film on the spindle instead of the spool, the brake shoe applied to the gear that operates the sprocket on the throw-out bracket, and the throw-out bracket in a position different from that shown in Fig. 1, and with the film gate in its opened position;

Fig. 9 is a section on the line 9—9 of Fig. 8;

Figs. 10 and 10a are different views of the measuring device;

Fig. 11 is a detail on the line 11—11 of Fig. 8;

Figs. 12 and 12a are different views of the movable half of the gate;

Fig. 13 is an end view of the spindle;

Fig. 14 shows the magazine closed with the cover in place;

Fig. 15 is an end view of the magazine showing the exposure opening;

Fig. 16 is a plan view of the bottom of the magazine; and

Fig. 17 is an enlarged detail showing the means for locking the cover onto the magazine.

The drawings show the magazine as having a bottom 5, a side wall 6, and cover 7 (Figs. 9 and 14). The side wall is molded with a ledge around its inner edge at 8 to make a light-tight joint with the cover 7.

The magazine is quite compact, and whether designed for a 50-foot film or 100-foot film, it may easily be slipped into a man's coat pocket. The compactness is largely due to the fact that the centers of the daylight spool 10 (on which the film is introduced into the magazine) and the spindle 11 (onto which the film is reeled in the magazine) are so close together that when the film is transferred from the spool onto the spindle, a part of the roll of film on the spindle is between the flanges of the spool 10, as indicated by the numeral 12 in Fig. 8. The spool fits into the circular depression 13 in the bottom of the magazine.

*The driving mechanism*

The magazine is operated from the camera, the motor of which will ordinarily be spring or electrically operated. The camera is provided with two driving prongs (not shown) which enter the openings 15 and 16 of the driving plate 17, clearly shown in Figs. 2 and 16. This plate is rigidly connected to the spindle 18, which drives the pinion 19 which, in turn, drives the gears which operate the magazine. As shown in Fig. 1, the pinion 19 drives the gear 20 which, in turn, drives the small gear 21 which drives the gear 22 to which the spindle 11 is connected by a friction arrangement which will be later described. In this way the spindle is driven from the motor of the camera, and the film 25 is wound up on the spindle as it is exposed.

The gear 20, likewise, drives the gear 30 which operates the sprocket 31 of the throw-out bracket in a manner to be described below.

*The movement of the film*

The film is purchased on the daylight spool 10. The magazine is opened, preferably in daylight, and the spool 10 is put in position in the magazine by placing it over the square spool support 33, best illustrated in Fig. 9. The film is transferred from this spool to the spindle 11 by the film-moving mechanism of the magazine which (1) turns the spindle through friction contact, (2) rotates the sprocket 31 which is in mesh with the perforations in the film, and (3) operates the pull-down arm, as explained below. Each of these aids in transferring the film from the spool to the spindle.

In returning the film from the spindle to the spool, the sprocket 31 of the throw-out bracket is out of mesh with the perforations in the film (Fig. 8), and the movement of the film is due solely to the drawing action produced by the turning of the spool. After exposure, the magazine is removed from the camera; so the rewinding of the film onto the spool is done by hand. The crank 34 is provided for this purpose. It is screwed into the opening 35 (Fig. 16) which is provided with left-hand threads, or it may be screwed into the opening 35a (Fig. 14) to avoid the speed-up gear 35', if desired. The crank 34, when inserted in the opening 35, turns the speed-up gear 35', the teeth of which mesh with teeth 36 which surround the spool support 33. The rotation of this support turns the spool which is resting on it. Thus, the film is reeled back onto the spool 10.

Any suitable friction drive may be used for turning the spindle. The drawings show the spindle 36' with the flange 37 against which the first portion of the film is wound. The nut 37' is threaded onto the spindle and holds the spring 38 in place in the cavity in the core 38' on which the film is wound. The screw head 39a holds the spindle in place. The fiber disk 39 provides frictional engagement between the core and the flange 37, allowing the core to lag behind the movement of the flange.

Fig. 13 is an end view of the spindle, showing the ratchet wheel 39' which is fastened to the gear 22 and the pawl 40 which is fastened to the flange 37. This ratchet permits the spindle to be turned backward when the driving mechanism, including the gear 22, is locked, as explained below. Such backward movement is necessary when the film is wound from the spindle back onto the spool after the entire film has been exposed. It also permits the spindle to be turned back a number of frames by the mechanism of the camera by movement of the knurled wheel 17, or by hand, for making fade-out and fade-in pictures.

When the magazine is loaded ready for use, perforations in two different portions of the film 25 mesh with the teeth of the throw-out sprocket 31. The film passes between the sprocket and the rollers 41 and 42 and then is looped free of the roller 43, which is mounted on the spindle 44 to which the arm 70 of the throw-out bracket is riveted. The film 25 then passes between the two guides or halves 45 and 46 of the gate and then over the guide rollers 47 and 48 onto the spindle 11, being looped free of the roller 49. This provides a loop of the film between the two portions which mesh with the teeth of the throw-out bracket. This loop passes in front of the exposure opening and is moved intermittently by the pull-down arm, as explained below.

If the two rollers 47 and 48 were stationary, it would be difficult to bring the sprocket 31 into mesh with the perforations in the film passing on both sides of it. By having these rollers movable, the perforations in the film on one side of the sprocket can first be brought into mesh with the sprocket while the sprocket is out of the fixed position shown in Fig. 1. Then the sprocket can be brought to the position shown in Fig. 1, and the film will be held in place by the rollers 41 and 42. Then the perforations can be brought into mesh with the teeth on the other side of the sprocket with the movable rollers 47 and 48 out of place. Then these rollers are brought up against the film.

A drilled hole in the cover plate 56 underneath roller 48 allows the end of the spring-pressed shaft that carries roller 48 to snap into place after the film is placed over the sprocket teeth. This cover plate 56 separates the gears from the larger portion of the magazine which constitutes the film-holding compartment.

The metal sheet 57, in which is an opening (not shown) which may be brought into register with the opening 50, slides in a suitable cavity in the wall of the magazine and serves as a shutter for the opening 50. Such shutters are known in the art. It is operated by the handle 58 which is protected from accidental opening by the web 59 on the outer wall of the magazine. When the magazine is placed in the camera, the latch which locks the cover of the camera shut cooperates with the handle 58 to open the exposure opening when the camera lid is closed and to close the exposure opening when the camera lid is opened.

The brake

It is readily understood that some means must be provided to prevent complete separation of the film 25 from the spool 10. If such separation should occur, it would be necessary to open the magazine with the film wound on the spindle instead of on the daylight spool. This would fog and ruin the film unless the operation were done in a dark room. The brake automatically prevents such separation of the film from the spool.

The amount of film on the spool is gauged by the arm 60. At somewhat less than an angle of 90° to this arm 60 is the brake arm 61 on which is mounted the brake shoe 62. The arm 60, the brake arm 61, and the release arm 63 are all integral with the sleeve which surrounds the shaft 66, which is stationary and preferably is pressed into place. Two detail views of this unit are shown in Figs. 10 and 10a.

On loading, the spool 10 is full, and to make space for it, the arm 60 is thrown out into a hollowed-out portion 64 of the wall of the magazine, as shown in Fig. 1. As the film is reeled onto the spindle 11, the amount of film on the spool 10 gradually decreases; and as it does so, the arm 60 is gradually drawn down toward the spool by the spring 65 (which is hooked into the peg 65' best shown in Fig. 10) while continually being pressed against the continually changing outer layer of film; and as the arm 60 is drawn down, the brake arm 61 is lowered toward the gear 30. As the amount of film left on the spool approximates about 3 feet ($\frac{1}{16}$ inch of reeled film), the shoe 62 on the brake arm 61 becomes wedged against the gear, stopping further operation of the film-moving mechanism. The shoe 62 is composed of fiber or fabric or the like which does not injure the teeth of the gear 30.

Fig. 8 shows the brake arm 61 and arm 60 in two positions. In the full-line position it is merely approaching the braking position. In the position shown in dotted lines the brake shoe is wedged against the gear, and the center line of the brake arm is approximately in a direct line with the pivot 66 and the center of the gear 30. This wedges the brake tightly against the gear and prevents rotation of the gear and any further movement of the driving mechanism.

The brake arm is not easily moved out of this braking position. The knob 67 on the release arm 63 is provided for manual release of the brake and the return of the arm 60 to the position shown in Fig. 1. This places the magazine in position for removal of the spool 10 after the exposed film has been wound back onto it and the insertion of a spool of fresh film.

The pressure of the arm 60 against the outer layer of film keeps the spool from overrunning as the film is unwound from it.

The arm 60 and brake arm 61 swing in a shallow cavity hollowed out of the bottom of the magazine. This cavity is extended to accommodate the cam on the throw-out bracket. This cavity extends from the dotted line 68 to the line 69 and extends downward to the line 69'.

The throw-out bracket and gate

The throw-out bracket 70 is adapted to be moved to either of the two positions shown in Figs. 1 and 8. It swivels around the shaft 44. This shaft 44 extends through the bottom of the magazine where, as shown in Fig. 16, it is connected with the indicator 71. This indicator is countersunk in the outside bottom face of the magazine as indicated at 72 and is capable of movement to the ready position or to the rewind position. The ready position is shown in Fig. 1, and the rewind position is shown in Fig. 8.

In the rewind position it is not necessary that the throw-out bracket be locked. However, in the ready position it is necessary that the bracket be locked so as to hold the sprocket 31 in mesh with the perforations in the film. This locking arrangement is best shown in the sectional view, Fig. 2. Here we see that the sprocket 31 is mounted on the shaft 75, which is hollowed out and contains the spring 76. The plunger shaft 77 operates against this spring. In line with this shaft 77 is the short shaft or stub 78, which is fastened to the spring 79, the bottom end of which is fastened to the bottom of the magazine by the screws 80 (Fig. 16). Over the shaft 78 and spring 79 is the shield 81 in which the hole 82 is provided. (See Fig. 16.) This hole permits the insertion of a pencil or other implement to push the shaft 77 against the spring and thus remove it from operating connection with the gear 30.

It is readily seen that when the shaft 77 is thus out of operative connection with the gear 30, the bracket 70 can be swung to the rewind position by merely shifting the indicator 71. As best shown in Fig. 2, the sprocket 31 is supported between the flanges 70 and 70' of the bracket which are fastened to move integrally with the spindle 44, which extends through the bottom of the magazine case where the indicator 71 is rigidly attached to it. By moving the indicator 71 to the ready or rewind position, the spindle is turned, and this throws the bracket to the one position or the other.

The bracket can only be swung to the rewind position after some implement has been inserted in the opening 82 to push the shaft 77 out of its opening in the gear 30. The throw-out bracket may then be moved to the position shown in Fig. 8 by turning the indicator 71. After the film has been rewound onto the spool 10, the throw-out bracket is moved back to the position shown in Fig. 1; and when it is swung fully into position, the spring 76 forces the shaft 77 into operative connection with the gear 30.

The shaft 77 terminates in an eight-toothed spline 86 which fits into the eight-pointed opening 87 in the gear 30 (Figs. 6 and 7). The eight teeth of the spline and eight points of the opening are equal in number to the eight teeth on the sprocket 31 and the eight openings 88 of the gear 30 (Fig. 6). Therefore, regardless of which points of the opening 87 the respective teeth of the spline 86 enter, the teeth of the sprocket 31 and the openings 88 of the gear 30 are always in the same relative positions. The reason for this will be explained in connection with the description of the locking mechanism shown in Figs. 3–5.

The gate which guides the film past the exposure opening is composed of the two halves 45 and 46. One end of the half 45 is fastened into the wall of the magazine. The half 46 (shown in Figs. 12 and 12a) is movable, the rings 90 at one end encircling the quill 85 which supports the throw-out bracket. When the film is passing the exposure opening, the two halves are adjacent one another, as shown in Fig. 1, and the film passes between them. The edges of each half are raised as at 89 in Fig. 12. These raised edges are brought into contact when the gate is closed, and the film passes through the opening between them. When the film is being rewound onto the spool, the half 46 is shifted to the position shown in Fig. 8.

The half 46 is moved from one position to the other by the movement of the throw-out bracket. The movement is provided by the link 91 shown in Figs. 1, 8, and 11. This link is pivoted around the shaft 92, which is mounted on the cover plate 56. As shown in Figs. 1 and 2, this cover plate 56 separates the gears 20, 21, and 30 from the film compartments of the magazine and extends way up to the shaft 44 on which the throw-out bracket 70 is mounted.

When the throw-out bracket is in the ready position shown in Fig. 1, the link 91 holds the gate half 46 against the gate half 45. When the throw-out bracket is thrown to the rewind position shown in Fig. 8, the link 91 pulls the gate half 46 away from the gate half 45, as shown in Fig. 1. This permits a free, rapid passage of the film between the two halves of the gate unimpeded by any frictional contact of the film with the gate halves.

The throw-out bracket is thrown to the position shown in Fig. 8 only after the film has been transferred to the spindle (except the last few inches or feet). With the bracket in this position, the magazine is ready for rewinding the film back onto the spool. At this time the brake shoe 62 is locked against the gear 30, but the need for locking the gear has ceased because the magazine has been removed from the camera. Therefore, a cam 95 is advantageously provided, preferably as an extension of the back flange 70', to break the lock of the brake shoe on the gear as the bracket is swung to the position shown in Fig. 8. When the throw-out bracket is thrown way out in this manner, the cam 95 presses against the arm 61 and kicks the shoe 62 out of contact with the gear 30. When thus pushed to the position shown in full lines in Fig. 8, the brake arm 61 and arm 60 can easily be swung to the position shown in Fig. 1. This cam 95 moves in the cavity above described which extends from the dotted line 68 to the line 69 and down to the line 69'.

The pull-down arm

The pull-down arm imparts to the film the intermittent motion which is characteristic of motion-picture operation. This pull-down arm 100 is mounted on the crank 101 (Fig. 2) attached to the drive shaft 18. As the drive shaft is rotated by the motor of the camera, the crank 101 circles the shaft and imparts the desired circular reciprocatory motion to the hook 102 at the end of the pull-down arm 100 (Fig. 8). The pull-down arm is supported by the crank 104 which is pivotally mounted on the stud 105, which is fastened to the back of the magazine. Thus, as the crank 101 rotates, it causes the hook 102 of the pull-down arm to reach out and enter a perforation on one side of the film, pull it down, be lifted out of the perforation, and reach out again. As shown in Fig. 1, the wall of the magazine is hollowed out at 106 to accommodate the movement of the pull-down arm which is shown in dotted lines in an extended position. There is nothing novel in the action of this pull-down arm. Although it is preferably located in the magazine, it may be located in the camera, in which case it will cooperate with perforations in the film through a suitable opening in the wall of the magazine.

At all times when the motor of the camera is driving the disk 17 and the shaft 18, the pull-down arm catches into the successive perforations in one side of the film and thus pulls the film in the general spool-spindle direction with the characteristic intermittent motion. This pull-down arm will work in the reverse direction; that is, it will feed film in either direction providing the camera motor or the knurled plate 17, for any reason, is turned in the reverse direction. This reverse direction is sometimes used in making double exposure for fade-in or fade-out scenes.

The length of the stroke of the pull-down arm is exactly the width of one of the frames of the film. As it operates, it brings the frames of the film successively into register with the exposure opening 50, and each frame is allowed to rest in register with this opening for the length of time it takes the pull-down arm to move from one perforation to the next.

In the magazine shown in the drawings, the film is exposed as it moves from the spool to the spindle. This movement is brought about by the drive of the motor in the camera, the motion of which is imparted to the drive shaft 18 which operates through the pinion 19 to drive the gear 20 which, in turn, drives the gear 30. This gear 30 drives the sprocket 31 with a uniform movement. The slack in the film as it leaves the upper side of the sprocket (Fig. 1) and returns to the sprocket at its lower side is the only portion of the film which is affected by the intermittent motion imparted to the film by the pull-down arm 100.

The locking device

As shown in the drawings, there are eight teeth on the sprocket 31, and Fig. 1 shows eight circular openings 88 in the gear 30, one adjacent each of the teeth. As there is one perforation in each margin of the film for each frame of the picture, eight frames flit past the exposure opening for each complete revolution of the sprocket 31. There are twelve teeth on the pinion 19, sixty teeth on the gear 20, and ninety-six teeth on the gear 30. The pinion 19, therefore, moves eight times as fast as the gear 30, and the pull-down arm completes eight cycles for each complete revolution of the sprocket 31.

In cameras equipped with a pull-down arm in the camera box, it is customary to have the drive mechanism come to a stop with the pull-down arm in the down position. The pull-down mechanism of this magazine is connected with drive mechanism of the camera which always stops with the driving prongs which fit into the holes 15 and 16 in such a position that the pull-down arm always stops in the down position. The gear 30, therefore, always stops in one of eight positions. Eight openings 88 are, therefore, provided so that regardless of which of the eight positions the gear 30 occupies when the mechanism stops, there will be an opening directly under the plunger ready to receive it.

This explains why the openings 15 and 16 are not arranged symmetrically in the plate 17. With the arrangement shown, it is necessary that the same driving prong always be inserted in the same opening, and this insures that the pull-down arm will always be brought to the down position when the mechanism stops.

As shown in Figs. 3–5, the pressure of the spring 112 against the inner side of the head of the cylinder 113 tends to keep the plunger 111 (also identified in Fig. 1) in the hole 88. The peg 114 which moves up and down in the opening 115 limits the movement of the cylinder to the length of this opening 115. The movement of the drive mechanism is unlocked when the cylinder 113 is pressed down, and the plunger 111 thereby lifted from the hole 88.

The spring 116 is attached to the support 117 for the lever 118 which connects the plunger 111 and the cylinder 113. The head 119 on the spring 116 normally engages the upper edge of the head of the cylinder (Fig. 5) and keeps the plunger 111 out of engagement with any of the holes 88.

When the cover 7 is in place on the magazine, the wedge-shaped guide 120 engages the head 119 on the spring and separates it from the cylinder 113 (Fig. 3). The spring 112 then causes the cylinder to rise, and the plunger 111 is inserted in one of the openings 88 and held there by the spring 112. Therefore, whenever the cover of the magazine is open (Fig. 5), the plunger 111 is out of the opening 88; and the gears and all parts connected therewith, such as the sprocket 31, may be rotated at will. The outer edge of the driving plate 17 is knurled (Fig. 2) to facilitate such movement, as, for example, adjustment of the teeth of the sprocket 31 to fit the perforations in the film as the film is threaded into the magazine. The spring head 119 may easily be moved out of engagement with the cylinder 113 if it is desired to lock the mechanism when the magazine is open. When the cover of the magazine is on, but the magazine is not in the camera (Fig. 3), the drive mechanism is locked; and, as explained above, a single frame of the film is held in register with the exposure opening 50. However, if the magazine is placed in the camera and the cover 125 of the camera is closed over the cover of the magazine (Fig. 4), the button 126 fastened to the interior of the camera enters the hole 127 in the cover 7 of the magazine (Fig. 14), and depresses the piston 128 which extends from the head of the cylinder 113, and this depresses the cylinder 113 and raises the plunger 111, unlocking the drive mechanism. The shield 129 protects the contents of the magazine from light admitted through the hole 127 and limits the movement of the piston 128 by contact with the collar 130, and this limits the movement of the cylinder 113.

This locking device is a valuable feature if the magazine is to be removed from the camera before all of the film has been exposed. For example, if the operator has a roll of film for colored pictures in the magazine, and after it has been half exposed, desires to take some black-and-white pictures, he can substitute one magazine for the other without danger of the film in the removed magazine shifting before reinsertion in the camera. By such shifting, one or more frames might be lost in the loops in either direction, some unexposed film might be transferred from the spool to the spindle and thus be lost, or exposed film on the spindle might shift back to the spool, in which case on return to the magazine the pictures already taken on this film would be ruined by double exposure. The locking device prevents this. It insures no movement whatever of the film while the magazine is out of the camera but permits complete freedom of movement when the magazine is open.

The drive mechanism in the camera always stops with the pull-down arm in the down position. The mechanism is locked in this position when the cover of the camera is opened for removal of the magazine. Usually, it will not be unlocked until the magazine is reinserted in the camera and the cover of the camera closed. If, for any reason, the mechanism is unlocked while the magazine is out of the camera, it can only be locked again when the openings 15 and 16 are returned to the proper position to receive the driving prongs.

The locking device in no way interferes with rewinding the film onto the spool by hand because when this is done, the throw-out bracket is out of mesh with the film.

By attempting to rotate the knurled driving plate 17, the operator may easily check to see that the driving mechanism is in a locked position and ready to receive the two driving prongs of the camera, which is the case when the two openings for the prongs are aligned with the darts at the "stop" sign 135 in Fig. 16. This is one of the reasons for having a locking position for each tooth of the feed sprocket 31.

If, for any reason, it is desirable to move the drive mechanism when the magazine is closed, the plunger 111 may be lifted from the hole 88 by applying pressure to the piston 128 through the hole 127 by a pencil or other sharp, pointed instrument.

Figs. 14 and 17 show simple means for holding the cover 7 in place. The three slides 140, 141, and 142 are countersunk in the bottom face of the magazine cover. Each is pivoted to the cover by a small pivot 143. The raised knob 144 facilitates sliding around the pivot. For each of these slides there is a stud 145 mounted on the magazine with a lateral slot 146 adapted to receive the slide. A hole 147 through the cover is provided for each stud. When the slides are in the position shown in Fig. 14, the cover 7 is held firmly in place. By swinging the slides to the position shown in Fig. 17, the slides are disengaged from the slotted studs, and the cover may easily be raised from the magazine, as shown.

The raised ribs 150 (Fig. 1) make the film roll evenly on the spindle with minimum friction. The flanges of the spool 10 are received in the countersunk areas which are just deep enough to bring the inside surfaces of the flanges to a level with the top of the ribs 150. The arc-shaped pads 152 press against the outer edges of the flanges of the spool 10 on each side of the line connecting the centers of the spool and the spindle, and thus keep the flanges of the spool from flaring as they would otherwise do. These pads preferably form the only contact between the flanges and the magazine case. The pads cause minimum friction and hold the flanges to the proper minimum width so that as the film is wound onto the spindle, each layer of film registers exactly with the preceding.

Fig. 14 shows usual attachments that may be used. For instance, on the right-hand side is a holder 153 for a sticker to indicate the type of film with which the magazine is loaded, such as high-speed film, colored film, etc. To the left of this is a usual type of footage indicator 154, operated by the spindle.

Modifications may be made in the specific structure shown in the drawings without avoiding the scope of the invention as defined in the appended claims.

What I claim is:

1. A film magazine adapted for insertion in a motion-picture camera, an exposure opening in the magazine, pull-down mechanism for passing the film before the exposure opening in one direction at a uniform speed by intermittent motion, means for passing the film past the exposure opening in the opposite direction at a higher rate of speed, a sprocket which meshes with perforations in portions of the film on each side of the portion adjacent the exposure opening during said intermittent movement, means for moving the sprocket out of mesh with the perforations in the film, and a gate which guides the film past said exposure opening, the gate being in two halves, one of which is connected with the sprocket so that when the sprocket is in mesh with perforations in the film, the gate is closed, and when the sprocket is out of mesh with the film, the gate is opened so that the film may more easily be passed rapidly therethrough.

2. A film magazine for a motion-picture camera, an exposure opening in the magazine, pull-down mechanism in the magazine for passing the film before the exposure opening in one direction at a uniform speed by intermittent motion, means for passing the film past the exposure opening in the opposite direction at a higher rate of speed, a swingable bracket with a sprocket fastened thereto away from the point of support, the teeth of which are adapted to mesh with perforations in portions of the film on both sides of the exposure opening; a gate formed in two halves and adapted to guide the film past the exposure opening, the half adjacent the exposure opening being stationary, the other half being movably supported and linked to a point of the bracket between the two ends by a link pivoted to the magazine so that as the bracket is moved in one direction and the other, the movable half of the gate moves toward and away from the stationary half, the movable half of the gate forming a guide for the film when separated from the other half and when the film is being moved past the exposure opening at the higher rate of speed.

3. A film magazine adapted for use in a motion-picture camera, said magazine being adapted to receive film on a daylight spool; a spindle parallel to the axis of the spool onto which the film is adapted to be wound from the spool, the distance between the centers of the spindle and the spool being less than the diameter of the flanges of the spool; an exposure opening in the magazine; a sprocket adapted to mesh with perforations in portions of the film on both sides of the portion of the film adjacent the exposure opening when the film is being transferred in one direction between the spindle and spool, said sprocket being adapted to be moved out of mesh with said portions of the film when the film is transferred in the opposite direction between the spindle and the spool; braking mechanism adapted to brake the mechanism for the transfer of the film in the first-mentioned direction when the transfer of the film is substantially completed; and means connected with the sprocket for releasing the brake when the sprocket is moved to the position out of mesh with the film.

4. A film magazine for a motion-picture camera, an exposure opening in the magazine, a gate to guide the film before the exposure opening, and pull-down mechanism in the magazine with mechanism for operating the same from drive mechanism in a camera in which the magazine is adapted to be inserted to move the film through the gate at a uniform rate of speed with intermittent motion, the gate being formed in two halves with the half nearest the exposure opening being substantially stationary and the pull-down mechanism situated to operate on the film when adjacent this stationary half, and the other half movable away from the exposure opening and the pull-down mechanism so that when the gate is opened so that the film may be passed rapidly between the halves, the film is out of the operating range of the pull-down mechanism.

5. A film magazine adapted for insertion in a motion-picture camera; an exposure opening in the magazine; two supports for the film therein; means for transferring the film from the first support to the second while passing in operative relation to the opening; a movable sprocket, the teeth of which mesh with the perforations in portions of the film on opposite sides of the film adjacent the opening in such transfer, the sprocket then being in one position; other means for transferring the film from the second support to the first support, the sprocket being capable of movement to a second position for such transfer, its teeth then being out of mesh with the perforations in the film; stationary means for maintaining the teeth of the sprocket in mesh with the perforations in one of said portions of the film when the sprocket is in the first position; and movable means for bringing said second portion of the film in sufficiently close proximity with the teeth of the sprocket to mesh with the perforations in the film while the sprocket is in the first position.

6. A motion-picture camera, a film magazine adapted for insertion therein, an exposure opening in the magazine, mechanism within the magazine for passing the film before the exposure opening, locking means within the magazine which prevents movement of said mechanism when locked and permits movement of said mechanism when unlocked, an opening in the cover of the magazine for insertion of unlocking means, and on the inner surface of the cover of the camera unlocking means adapted to enter said opening when the cover of the camera is closed over the magazine.

7. A film magazine adapted for use in a motion-picture camera, an exposure opening therein, a sprocket, the teeth of which are adapted to mesh with portions of the film on each side of the exposure opening, mechanism in the magazine for turning the sprocket, a lock to prevent movement of said mechanism in any of various equally spaced positions equal in number to the number of the teeth on the sprocket, and an opening in the cover of the magazine for insertion of unlocking means.

8. A film magazine for a motion-picture camera, an exposure opening therein, a sprocket, the teeth of which are adapted to mesh with portions of the film on each side of the exposure opening, the sprocket being mounted so as to be capable of being swung in and out of mesh with the film, mechanism within the magazine for passing the film before the exposure opening and driving the sprocket when in mesh with the film, locking means within the magazine which prevents movement of said mechanism when locked and permits movement of said mechanism when unlocked, the locking means being spring pressed into the locking position, and an opening in the magazine adapted for the insertion of unlocking means to counteract the effect of said spring.

9. A film magazine adapted for use in a motion-picture camera, an exposure opening therein, film-moving mechanism, a pull-down arm for intermittent movement of film before said opening, means for locking said film-moving mechanism with any one of a plurality of cooperating means on the film-moving mechanism, said individual cooperating means being spaced a distance corresponding to a complete cycle in the movement of the pull-down arm so that regardless of which of the cooperating means the locking means coacts with, the pull-down arm is always at the same position in its cycle when the film-moving mechanism is locked.

10. A film magazine adapted for use in a motion-picture camera; an exposure opening in the magazine; mechanism for moving the film before the opening, there being perforations in the film spaced in the same relative position to each frame of the film; a sprocket with teeth adapted to mesh with the perforations, the axle of the sprocket being removably insertable in a complementary opening in the center of a gear which comprises a part of said film-moving mechanism; the end of the axle and the complementary opening therefor in the center of the gear each being formed of like segments equal in number to the number of the teeth on the sprocket; a plurality of like means on said gear for cooperation with the locking means to prevent rotation of said gear, the number of said cooperating means being equal to the number of teeth on the sprocket.

11. A film magazine for use in a motion-picture camera, an exposure opening in the magazine, mechanism for moving the film before said opening and means for locking and unlocking said mechanism to prevent and permit movement thereof respectively, said last-mentioned means comprising a bolt with means for receiving the same in the film-moving mechanism, the bolt being mounted for reciprocal movement actuated by a spring-pressed member to which it is connected so that the spring tends to keep the bolt in said receiving means, an opening in the magazine for insertion of unlocking means to move said member against the action of the spring, a second spring with a head thereon adapted to cooperate with said spring-pressed member to hold it against movement by the spring, and on the cover of the magazine means adapted to separate the spring head from the spring-pressed member when the cover is closed.

12. A film magazine for insertion in a motion-picture camera adapted to receive film on a daylight spool, a spindle with means for winding film thereon from the spool and other means for winding film from the spindle back onto the spool, an exposure opening in the magazine, perforations in the film, a movable sprocket with teeth adapted to mesh in perforations in portions of the film on each side of the portion adjacent the opening, means for releasing the sprocket from this position so that it may be moved out of mesh with the film, a gate adapted to guide the film past the exposure opening, one half of which gate is movable and connected to the sprocket so that when the sprocket is out of mesh with the film, the gate is opened to facilitate rapid movement of the film past the opening, pull-down mechanism adapted to engage the film when the gate is closed and out of contact with the film when the gate is open, braking mechanism adapted to stop the movement of the film past the opening through the closed gate, detector means to determine when in such passage substantially the whole of the film has passed the exposure opening and to actuate the braking mechanism to prevent complete transferral of the film from the support from which it is being unwound, and means associated with the sprocket to release the braking mechanism when the sprocket is moved out of meshing relation with the perforations in the film.

13. A film magazine for insertion in a motion-picture camera adapted to receive film on a daylight spool; a spindle with means for winding film thereon from the spool and other means for winding film from the spindle back onto the spool; an exposure opening in the magazine; perforations in the film; a movable sprocket with teeth adapted to mesh in perforations in portions of the film on each side of the portion adjacent the opening; means on the outside of the magazine for releasing the sprocket from this position and moving it out of mesh with the film; a gate adapted to guide the film past the exposure opening, one half of which gate is movable and connected to the sprocket so that when the sprocket is out of mesh with the film, the gate is opened to facilitate rapid movement of the film past the opening; pull-down mechanism adapted to engage the film when the gate is closed and out of contact with the film when the gate is open; braking mechanism adapted to stop the movement of the film past the opening through the closed gate; detector means to determine when in such passage substantially the whole of the film has passed the exposure opening and to actuate the braking mechanism to prevent complete transferral of the film from the support from which it is being unwound; means associated with the sprocket to release the braking mechanism when the sprocket is moved out of meshing relation with the perforations in the film; and locking means locked by the cover of the magazine which prevents movement of the film when the magazine is closed, which locking means is so designed that it is unlocked when the cover of the magazine is removed so that movement of the film is then permitted.

14. A film magazine adapted for insertion in a motion-picture camera, an exposure opening in the magazine, mechanism for passing the film before the exposure opening in one direction at a uniform rate of speed but with intermittent motion, means for passing the film past the exposure opening in the opposite direction at a higher rate of speed, a sprocket which meshes with perforations in portions of the film which, during said intermittent movement, are on opposite sides of the portion adjacent the exposure opening, and means controlled from the outside of the magazine for moving the sprocket out of mesh with the perforations in the film and for moving it back to the position in which it is adapted to mesh with the film.

15. A film magazine adapted for insertion in a motion-picture camera; an exposure opening in the magazine; mechanism for passing the film before the exposure opening in one direction at a uniform rate of speed but with intermittent motion; means for passing the film past the exposure opening in the opposite direction at a higher rate of speed; a sprocket which meshes with perforations in portions of the film which, during said intermittent movement, are on opposite sides of the portion adjacent the exposure opening; means for moving the sprocket out of mesh with the perforations in the film; and a gate which guides the film past the exposure opening, the gate being in two halves, one of which is connected with the sprocket so that when the sprocket is in mesh with perforations in the film, the gate is closed, and when the sprocket is out of mesh with the film, the gate is opened so that the film may more easily be passed rapidly therethrough; a roller near each end of the gate around which, but free of which, the film is adapted to be looped for such intermittent movement before the opening and between the two points on the sprocket where the perforations in the film mesh with teeth on the sprocket; said rollers being so situated that when the sprocket is out of mesh with the film and the gate is opened, the film passing from contact with one of said rollers is led by said movable half of the gate into contact with the other roller.

16. A film magazine adapted for use in a motion-picture camera; an exposure opening in the magazine; mechanism for moving the film before the opening, there being perforations in the film spaced in the same relative position to each frame of the film; a sprocket with teeth adapted to mesh with the perforations, the axle of the sprocket being removably insertable in a complementary opening in the center of a gear which comprises a part of said film-moving mechanism; the end of the axle and the complementary opening therefor in the center of the gear each being formed of like segments, the ratio of the number of teeth to the number of segments being a whole number.

17. A film magazine for insertion in a motion-picture camera, a gear train for moving the film therein, in the center of one of said gears a multi-pointed opening, a sprocket the teeth of which mesh with perforations in the film for driving the film, one end of the axle of said sprocket being multi-pointed and complementary to said multi-pointed opening and adapted to be moved into and out of said opening, equidistant openings in said gear in a circle about said multi-pointed opening, and locking means adapted to be moved into and out of said openings.

18. A film magazine for insertion in a motion-picture camera, an exposure opening therein, a sprocket the teeth of which are adapted to mesh with perforations in the film, means for moving the sprocket into and out of mesh with the perforations in the film, a train of gears to impart motion to the sprocket, the sprocket being adapted to be brought into driving connection with the gears in "$x$" number of positions, the train of gears being adapted to be locked in "$x$" number of positions, a reciprocating pull-down arm driven with said train of gears and adapted to make "$y$" complete cycles for each complete revolution of the sprocket when in driving connection with the gears, the number of teeth on the sprocket divided by "$x$" being a small whole number, and "$y$" divided by "$x$" being a small whole number.

19. A magazine for use in a motion-picture camera adapted to use film having perforations therein which are uniformly spaced with respect to each frame of the film, an exposure opening in the magazine, within the magazine pull-down mechanism which includes means for insertion in and withdrawal from progressively different perforations in the film with means for thereby moving the film intermittently before the exposure opening, a sprocket for engagement with perforations in the film before it passes in front of the exposure opening, means connecting (1) said sprocket and (2) that portion of the pull-down mechanism which motivates the means for insertion in and withdrawal from the perforations in the film to cause the two to operate as a unit, and means for locking (a) said sprocket, (b) pull-down motivating mechanism, and (c) connecting means against movement at only that stage in the cycle of operation when said means for insertion in and withdrawal from the perforations in the film is engaged in such a perforation.

20. A film magazine for a motion-picture camera, an exposure opening in the magazine, mechanism for passing the film before the exposure opening in one direction at a uniform speed by intermittent motion, means for passing the film past the exposure opening in the opposite direction at a higher rate of speed, a swingable bracket with a sprocket fastened thereto away from the point of support, the teeth of which are adapted to mesh with perforations in portions of the film on both sides of the exposure opening, a gate at the exposure opening formed in two halves and adapted to guide the film past the exposure opening, the half adjacent the exposure opening being stationary, the other half being movably supported and linked to the bracket by a link pivoted to the magazine so that as the bracket is moved in one direction and the other, the movable half of the gate moves toward and away from the stationary half, the movable half of the gate forming a guide for the film when separated from the other half and when the film is being moved past the exposure opening at the higher rate of speed.

HERBERT LLOYD WILLIAMS.

REFERENCES CITED

The following references are of record in the file of this patent:

UNITED STATES PATENTS

| Number | Name | Date |
|---|---|---|
| 2,089,330 | Becker | Aug. 10, 1937 |
| 1,897,903 | Hopkins | Feb. 14, 1933 |
| 2,091,508 | Howell | Aug. 31, 1937 |
| 1,984,111 | Bouveng | Dec. 11, 1934 |
| 2,051,787 | Foster | Aug. 18, 1936 |
| 2,203,655 | Lechleitner et al. | June 4, 1940 |

(Other references on following page)

UNITED STATES PATENTS

| Number | Name | Date |
|---|---|---|
| 2,327,857 | Bolsey | Aug. 24, 1943 |
| 2,028,608 | Howell | Jan. 21, 1936 |
| 2,175,538 | Morsbach et al. | Oct. 10, 1939 |
| 2,351,088 | Wilson et al. | June 13, 1944 |
| 2,362,019 | Moore | Nov. 7, 1944 |
| 1,771,651 | Newman | July 29, 1930 |
| 1,372,675 | Davis | Mar. 29, 1921 |
| 1,685,010 | Thornton | Sept. 18, 1928 |
| 2,206,032 | Foster | July 2, 1940 |
| 2,080,021 | Wittel | May 11, 1937 |
| 2,186,612 | Mihalyi | Jan. 9, 1940 |
| 2,317,096 | Dunn | Apr. 20, 1943 |
| 2,319,530 | Bolsey | May 18, 1943 |
| 2,143,756 | Bouveng et al. | Jan. 10, 1939 |
| 1,510,738 | Capstaff | Oct. 7, 1924 |
| 1,638,569 | Fritts | Aug. 9, 1927 |
| 2,326,654 | Jaqust | Aug. 10, 1943 |
| 2,379,690 | Cunningham | July 3, 1945 |